United States Patent [19]
Wilkins et al.

[11] Patent Number: 5,746,305
[45] Date of Patent: May 5, 1998

[54] SLAT SORTER

[75] Inventors: John J. Wilkins; Walter L. Steffens, both of Cincinnati, Ohio

[73] Assignee: HK Systems, Inc., New Berlin, Wis.

[21] Appl. No.: 755,385

[22] Filed: Nov. 22, 1996

Related U.S. Application Data

[62] Division of Ser. No. 467,844, Jun. 6, 1995, Pat. No. 5,590,758.

[51] Int. Cl.$^6$ ................................. B65G 47/26
[52] U.S. Cl. .................. 198/890.1; 198/440; 198/838
[58] Field of Search ........................ 198/440, 445, 198/890.1, 838

[56] References Cited

U.S. PATENT DOCUMENTS

| | | | |
|---|---|---|---|
| 1,069,901 | 8/1913 | Petersen | 198/803.2 |
| 3,731,782 | 5/1973 | Del Rosso | 198/849 X |
| 3,780,850 | 12/1973 | McSwiggin | 198/890.1 X |
| 3,987,888 | 10/1976 | Wickam | 198/890.1 X |
| 4,089,408 | 5/1978 | Vanderhoof | 198/803.2 X |
| 4,138,008 | 2/1979 | Del Rosso | 198/890.1 |
| 4,637,508 | 1/1987 | Kikuchi et al. | 198/803.2 X |
| 4,917,233 | 4/1990 | Tsuda et al. | 198/838 X |
| 4,932,515 | 6/1990 | Stohr | 198/838 X |
| 4,946,022 | 8/1990 | Davis et al. | 198/890.1 |
| 4,984,675 | 1/1991 | Yamabe et al. | 198/890.1 |
| 5,060,788 | 10/1991 | Compton et al. | 198/838 X |
| 5,217,103 | 6/1993 | Umlauf | 198/890.1 |
| 5,217,105 | 6/1993 | Sapp et al. | 198/440 X |
| 5,323,912 | 6/1994 | Fan et al. | 198/890.1 X |
| 5,590,758 | 1/1997 | Wilkins et al. | 198/890.1 |

*Primary Examiner*—D. Glenn Dayoan
*Attorney, Agent, or Firm*—Nilles & Nilles, S.C.

[57] ABSTRACT

A slat sorter having a series of platens slidably mounted on an array of slats driven by an endless chain with each platen having a diverter pin for enabling it to be diverted between a straight-through track and at least one divert track. A switch having an elongated arm having a pivot end and a tip opposite and upstream the pivot end which is urged by a prime mover, that preferably is a limited angle torque electric motor, between a straight-through position directing a diverter pin to travel along the straight-through track and a divert position directing the diverter pin to travel along the divert track. The arm has a cutout which allows the arm to be urged from one position to the another position before the diverter pin is completely downstream and cleared of the arm. Operably associated with the arm is a brake for enabling the arm to be urged toward either the straight-through or divert position by an oncoming divert pin to prevent the divert pin from colliding head-on with the arm. Each slat is adjacent a wheel-like bearing on a track of the sorter with the bearing being attached to a boss extending outwardly from the slat. The boss is part of a bushing pressed into the end of the slat which accepts a ball detent pin that can be withdrawn from the bushing and boss to permit removal of the slat.

39 Claims, 9 Drawing Sheets

1
SLAT SORTER

CROSS REFERENCE TO RELATED APPLICATION

This application is a divisional of U.S. application Ser. No. 08/467,844 filed on Jun. 6, 1995 and which has been allowed as U.S. Pat. No. 5,590,758.

FIELD OF THE INVENTION

The invention relates to a slat sorter comprising a conveyor with movable platens on the top surface thereof which receive and selectively position a series of articles across the width of the conveyor.

BACKGROUND OF THE INVENTION

Slat sorters are well known in the art and are used to rearrange a single file line of articles on a conveyor into a preselected array of articles positioned across the width of the conveyor. Such sorters are used for example to rearrange articles into a desired pattern for delivery to the in-feed of a palletizer. As higher throughput rates are required of all material handling systems the throughput rate of a slat sorter must be increased as well. In order to accomplish this, some elements of the slat sorter must be redesigned to accommodate the higher speed of operation. For example, the switches in the sorter which divert the platens to a desired position must be designed to switch from a straight-through position to a divert position, and vice versa, in a minimum amount of time in order to handle the increased speed of the platens without creating a jam, or missed divert situation. As the speed of the slat sorter increases, the wear of the individual components likewise increases, and accordingly, the components should be designed to operate with minimized wear and to be easily removed and replaced when replacement is necessary.

SUMMARY AND OBJECTS OF THE INVENTION

In accordance with the instant invention, each divert switch in a slat sorter has a switch arm with a cutout to allow the arm to move to a divert position before the preceding diverter pin has completed its travel past the arm. Each switch arm is driven by a limited angle electric torque motor which includes a brake to provide resistance to rotation of the motor and the switch arm when power to the motor is interrupted. This will prevent the arm from drifting into an intermediate position which could cause a crash with oncoming pins in the event that a single motor fails. The drive chains of the sorter are attached to the conveyor slats by means of short pins which may be easily withdrawn from the slats to allow replacement of the slats when necessary. The pins are formed with smooth flat heads which are hardened and ride against a lateral wear strip on the conveyor frame without unduly wearing either the pin heads or the strip.

It is accordingly an object of the invention to provide a slat sorter which is designed to be operated at increased speed to achieve higher throughput rates.

It is another object of the invention to provide a slat sorter in which the individual switch components are designed to be operated with minimized wear and to be easily removed and replaced when replacement becomes necessary.

It is another object of the invention to provide a motor for a switch arm which includes a brake to hold the arm in a desired position in the event of motor failure.

It is still another object of the invention to provide a bearing surface on the side of the slat sorter drive chain which rides against a lateral wear strip on the conveyor frame to provide lateral chain guidance.

It is a still further object of the invention to provide a rotatable bearing carried by a slat that rolls like a wheel on a support track attached to the slat sorter frame to support the slat.

These and other objects of the invention will be apparent from the following detailed description in which reference numerals used throughout the description correspond to those used on the drawing figures.

DESCRIPTION OF THE PREFERRED EMBODIMENT

Figure 1:
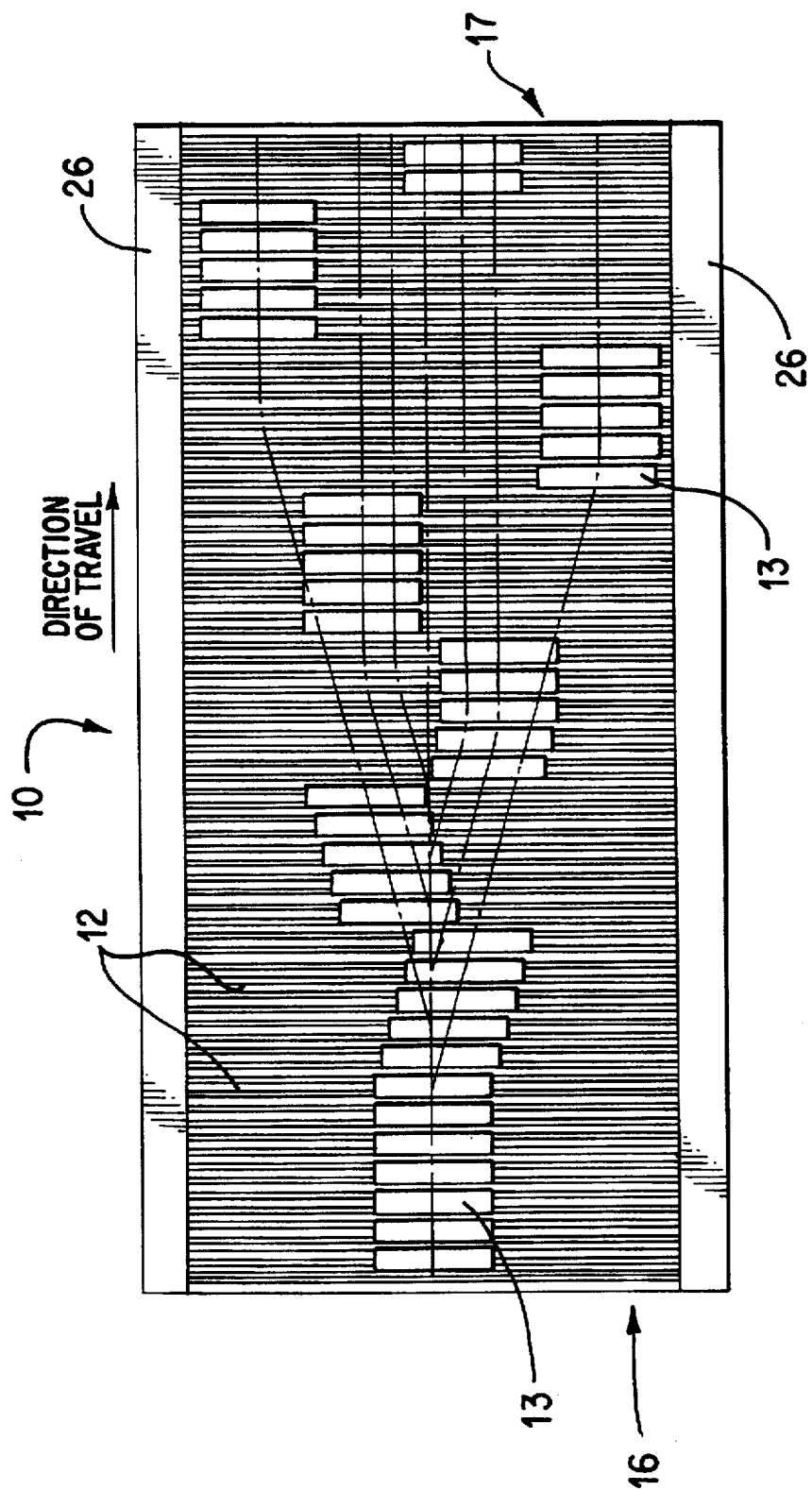
FIG. 1 is a plan view of the slat sorter of the invention.

Turning now to the drawing figures, there shown in FIG. 1 is a plan view of a slat sorter generally designated by the reference numeral 10. The sorter comprises a conveyor surface formed by a plurality of tubes or slats 12 which support platens 13 which carry articles (not shown). The slats 12 are connected at either end to endless drive chains 14 which advance the slats and the platens along the length of the slat sorter from the in-feed end 16 to the discharge end 17.

Figure 4:
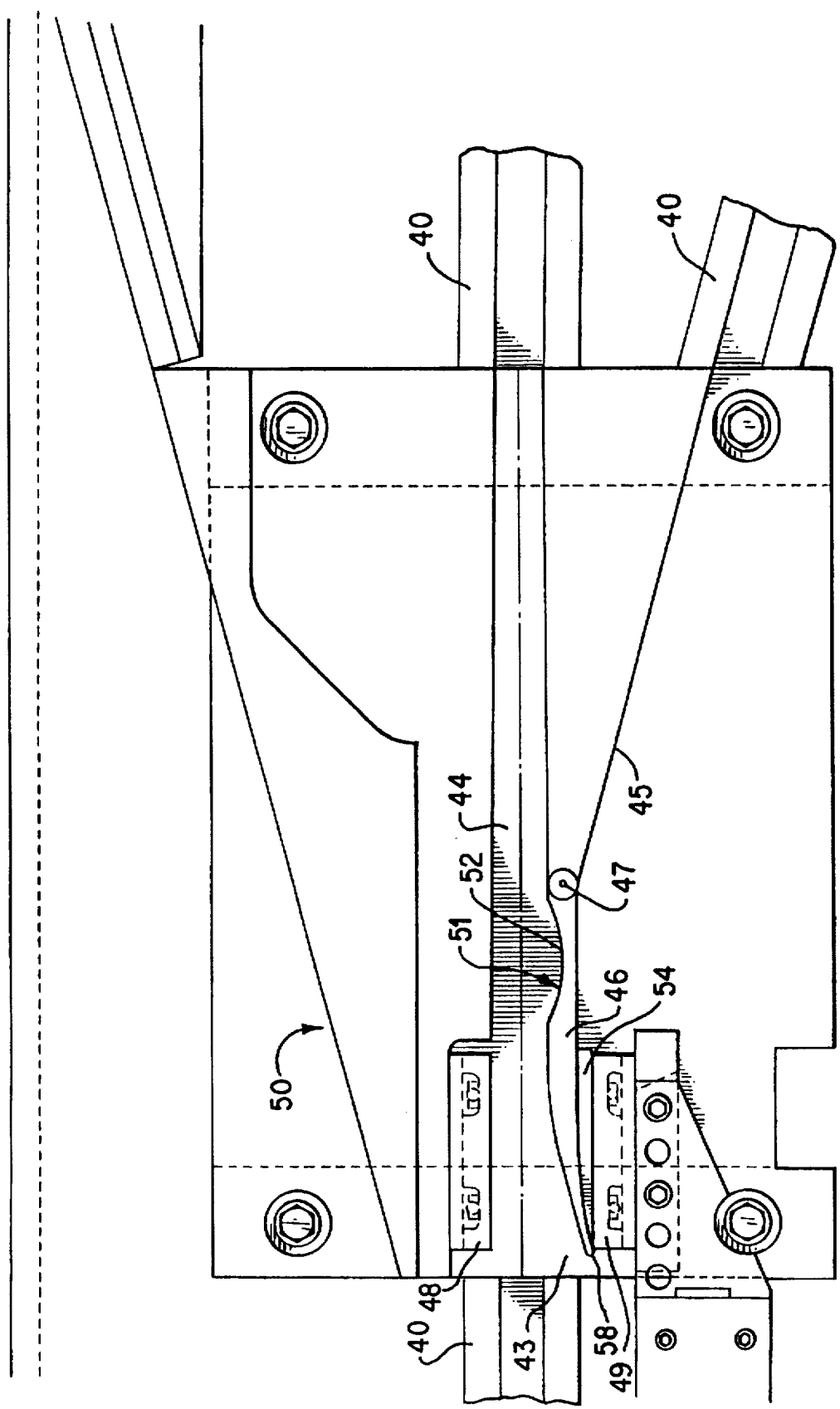
FIGS. 4 and 5 show a divert switch in the straight through and divert positions, respectively.

All of the platens 13 at the in-feed end 16 of the slat sorter are positioned midway between the sides of the sorter. Cam tracks and switches (as shown in FIG. 4) are located beneath the surface of the sorter and are used to divert the platens 13 to one of several final platen positions at the discharge end 17 in a manner which is well known in the art. Other configurations of the slat sorter are possible in which the platens 13 at the infeed end 16 are initially located at some other position across the width of the slats 12.

Figure 2:
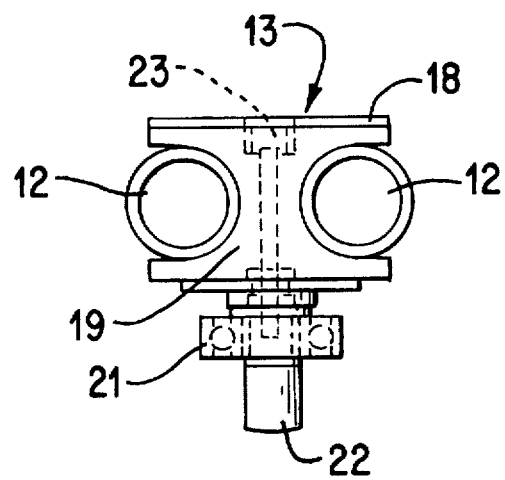
FIG. 2 is an end view of a slat assembly and a platen from the slat sorter of FIG. 1.
Figure 8:
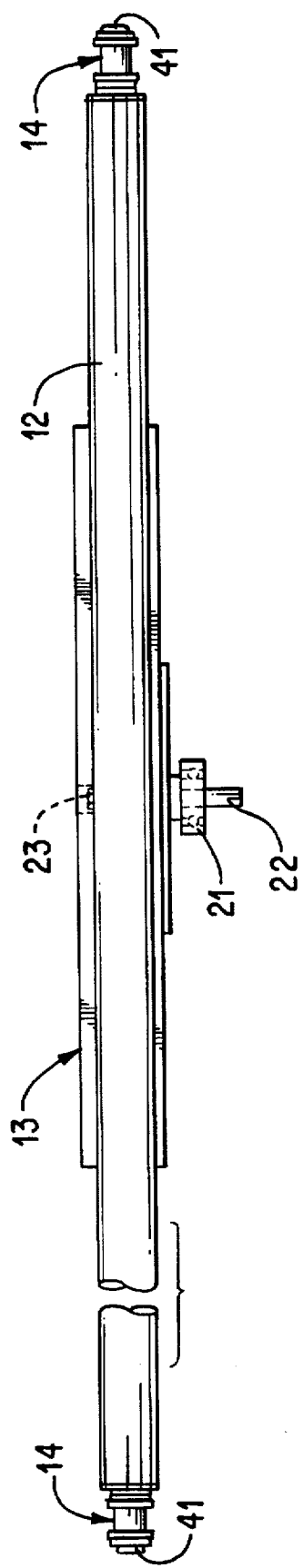
FIG. 8 is a front view of the slat assembly of FIG. 2.

As shown in FIG. 2, each platen 13 is mounted on a pair of slats 12 and includes a top surface 18 and a body 19. A bearing 21 and a diverter pin 22 are attached to the underside of the body 19 by a threaded fastener 23 which passes through the body. In use, the diverter pin 22 and the bearing 21 are guided by cam tracks and switches positioned below the surface of the slat sorter which control the motion of the platens as they are driven by the endless chains 14 to the discharge end 17. FIG. 8 shows a front view of the slat assembly of FIG. 2.

Figure 3:
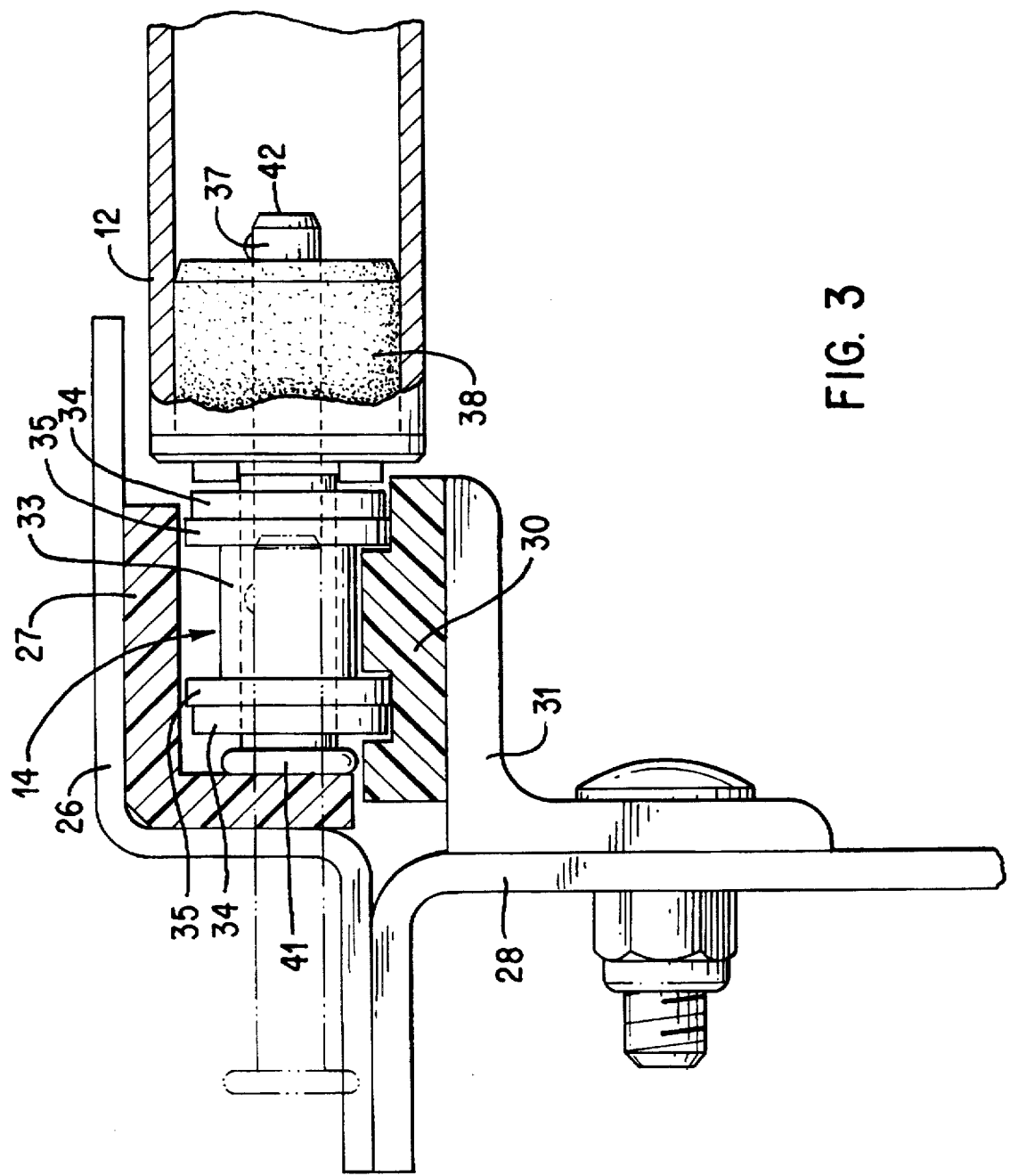
FIG. 3 is a detail view of the attachment of a slat to the drive chain of a slat sorter.

FIG. 3 shows in detail the attachment of the drive chain 14 to one end of a slat 12. A cover flange 26 which includes a UHMW wear strip 27 is mounted to the frame 28 of the sorter and protects the chain from dirt and other foreign articles. The chain 14 rides on a UHMW track 30 which is mounted on a bracket 31. The chain 14 comprises commercially available hollow-pin chain which employs a hollow pin 33 to join adjacent links 34 and 35 to one another. A ball detent pin 37 passes through the hollow pin 33 of the chain to couple the chain to the end of the slat. A resilient bushing 38 preferably formed from urethane, is pressed into the end of the slat 12 and receives the ball detent pin 37. The ball detent pin extends only a short distance into the end of the slat and is formed with a large smooth head 41 which forms a bearing surface to ride against the UHMW wear strip 27. The head 41 and the shank of the pin 37 which engages the bore of the hollow pin 33 is hardened to resist wear.

In order to remove a slat 12 from the chain 14, it is only necessary to remove the cover flange 26 with the strip 27 and withdraw the ball detent pin 37 a sufficient amount so that the end 42 of the pin is drawn out of engagement with the bushing 38 in the slat. Once this has been done the end of the slat 12 can be lifted from the chain 14 and withdrawn from engagement with the connection means which secures the other end of the slat to the other drive chain (not shown). The other end of the slat may be secured to the other chain with a ball detent pin or with a plain pin which extends from the chain to en-age the slat without departing from the spirit of the invention.

In known prior art constructions, the slats are attached to the chains by a rod which extends from one end of the slat to the other and is secured to the chain at either end by threaded fasteners, cotter pins, horseshoe clips, or the like. In order to remove a slat from the chain, the rod must be withdrawn completely from the slat requiring a clearance space at least as great as the length of the rod alongside of the conveyor frame. Assuming the conveyor is 48" wide, a 48" clearance space is required in order to withdraw the rod. Most rods have a clean sharp edged end and this end rides along the UHMW wear strip 27 on the side of the conveyor. The sharp edged end rapidly wears the strip 27 requiring replacement of the strip to prevent damage to the conveyor frame and the rod end.

Figure 7:
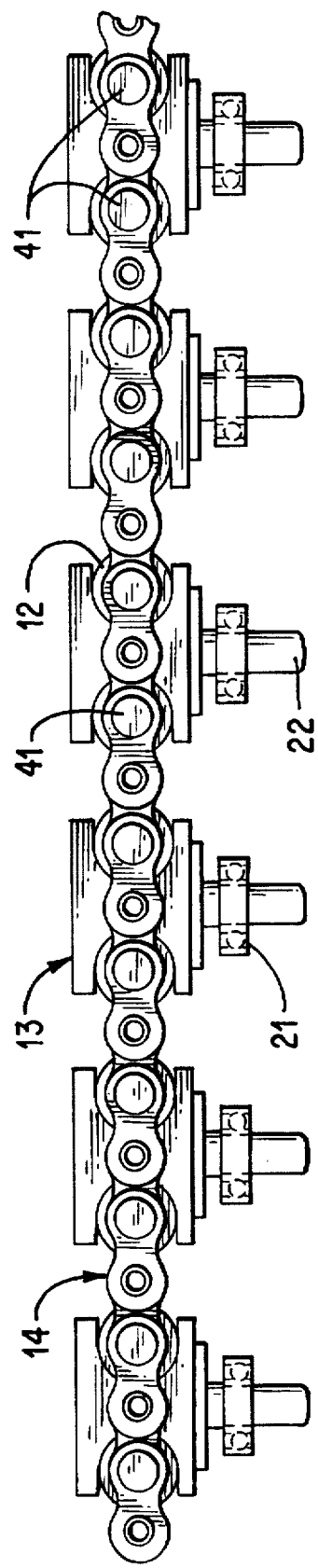
FIG. 7 is a side view of a plurality of slat assemblies coupled to a chain.
Figure 9:
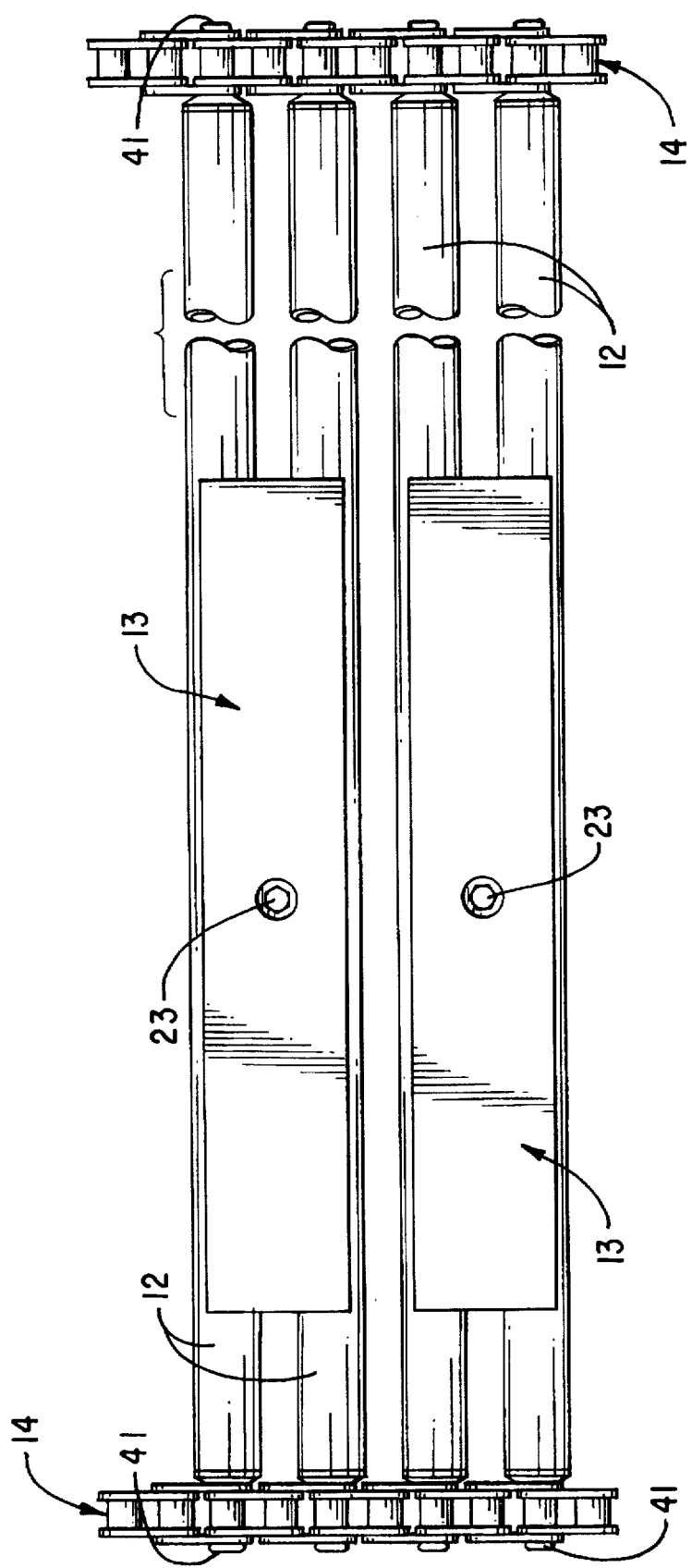
FIG. 9 is a top view of FIG. 7 showing two slat assemblies.

FIG. 7 shows a plurality of slat assemblies coupled to a length of drive chain 14. FIG. 9 is a top view of the construction shown in FIG. 7 showing two slat assemblies coupled at both ends to drive chains 14.

Figure 5:
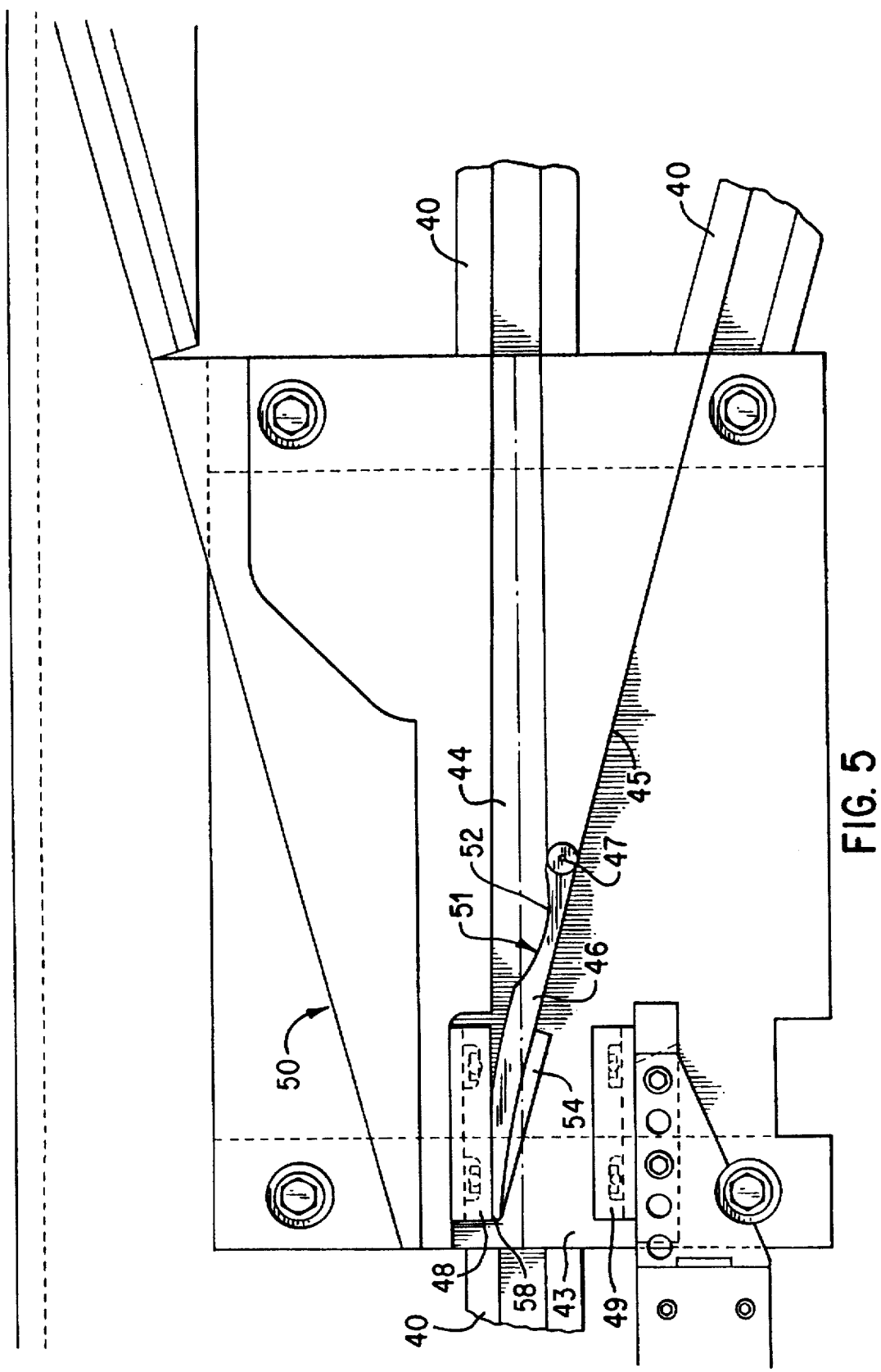

FIGS. 4 and 5 show a divert switch 50 in the straight-through and divert positions respectively. Sections of pin track 40 are coupled to the infeed and exit portions of the switch. The switch 50 comprises an infeed track 43, a straight through track 44, a divert track 45, and an arm 46 which is pivoted on an axis 47 to swing between two stops 48 and 49. In the position shown in FIG. 4, a lower stop flange 54 formed on the lower edge of the arm 46 rests against the stop 49. The arm 46 includes a cutout 51, the downstream or exit portion 52 of which, as shown in FIG. 5, is in alignment with the straight-through exit track 44 when the arm is in the divert position as shown in FIG. 5. The cutout 51 allows the arm to return to the divert position against the stop 48 from the straight-through position against the stop 49 before the divert pin 22 has left the exit portion 52 of the cutout 51 resulting in faster switching times.

Figure 6:
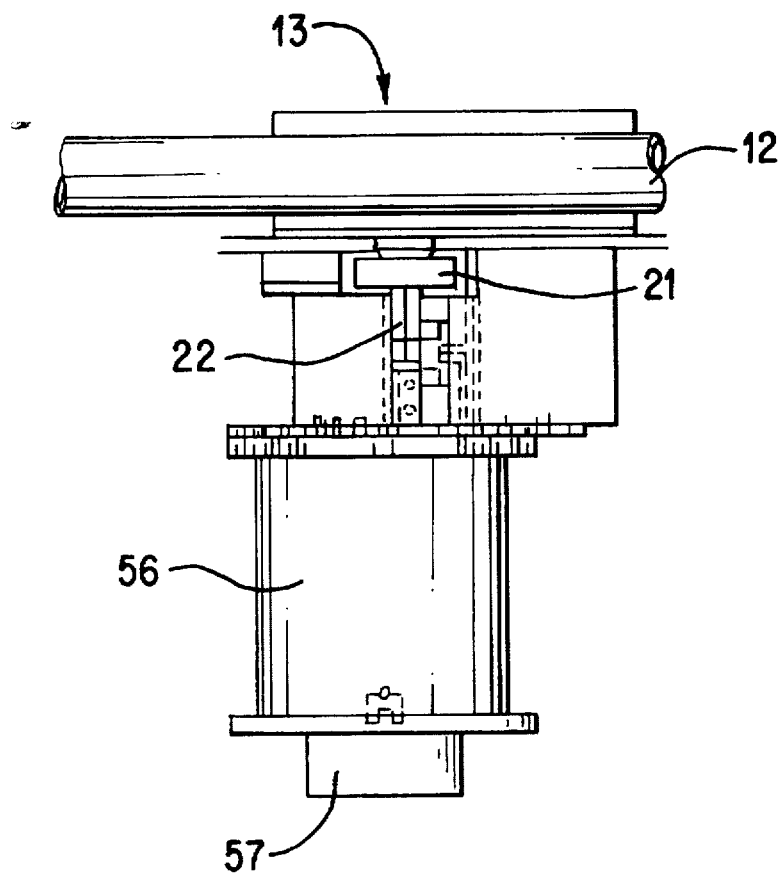
FIG. 6 shows a motor and a brake assembly for a divert switch.

The switch arm 46 is driven by an electric motor 56 as shown in FIG. 6. The motor is a limited angle torque motor which drives the arm to the desired position against one of the stops 48 and 49 in response to the application of switching signals. A brake 57 mounted on the end of the motor 56 holds the arm against one of the stops 48 and 49 in the event of loss of power to the motor. The brake provides resistance to arm motion but does not lock the arm in an immovable position. As a result, a diverter pin which strikes the side of a switch arm will rotate the arm against the resistance of the brake until it comes to rest against one of the stops. Once the arm is against one of the stops, the brake will hold the arm in that position, preventing it from drifting into a position where the arm tip 58 could be struck head-on by a diverter pin.

Figure 10:
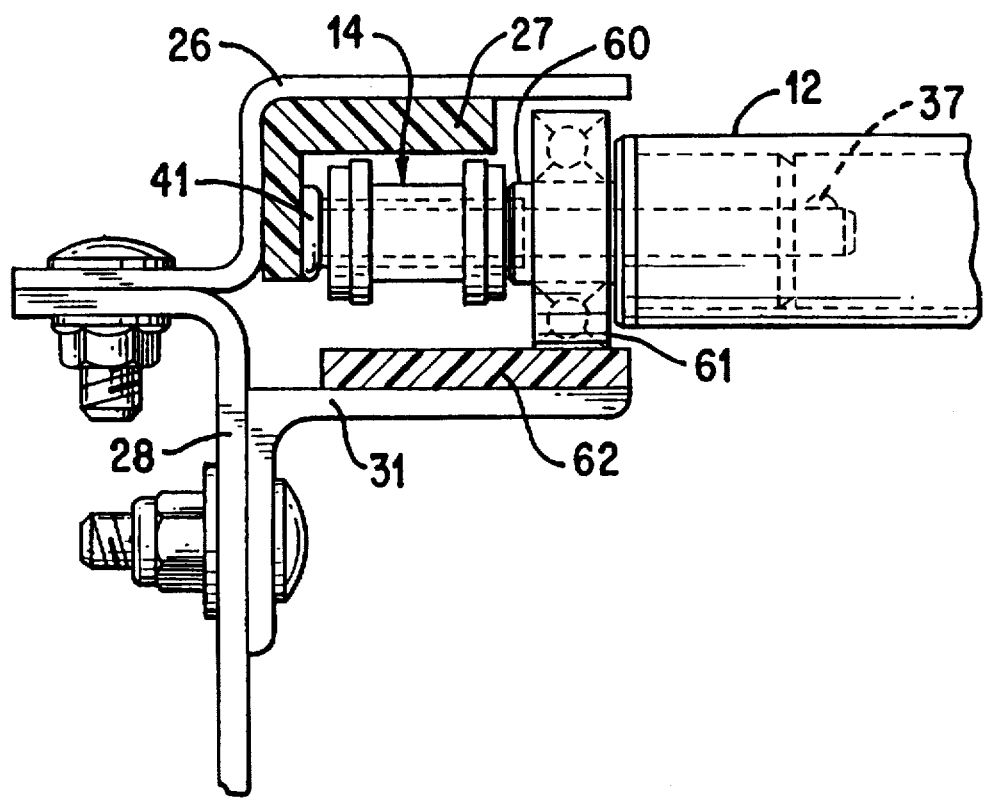
FIG. 10 shows a preferred embodiment of the invention in which the slat is supported by a bearing.

FIG. 10 shows a preferred embodiment of the invention in which a boss 60 is formed on the end of the bushing 38 and a ball bearing 61 is mounted on the boss. The bearing 61 rolls like a wheel on a track 62 which is mounted on the bracket 31. In use, the rolling, resistance of the bearing 61 on the track 62 is less than the sliding resistance of the chain 14 on the track 30 shown in FIG. 3, allowing the embodiment of FIG. 10 to run at higher speeds and to carry heavier loads. If desired, the track 62 can be formed with a rectangular trough wide enough to accommodate the width of the bearing 61 to provide additional guidance for the bearing.

Having thus described the invention, various alterations and modifications will occur to those skilled in the art, which modifications and alterations are intended to be within the scope of the invention as defined by the appended claims.

What is claimed is:

1. A slat sorter having a series of platens slidably mounted on an array of slats which are driven by a pair of endless chains, each having an innermost lateral side portion, the sorter comprising:

a frame, a track mounted on the frame so as to support the slats, and a bearing mounted on the end of a slat, wherein the bearing is positioned between the end of the slat and the innermost lateral side portion of one of the chains, so as to function as a wheel and roll on the track to support the slat.

2. The slat sorter of claim 1 wherein the bearing is a ball bearing.

3. The slat sorter of claim 2 wherein a boss extends from the slat end and the bearing is mounted on the boss.

4. The slat sorter of claim 1 further comprising a diverter pin on the underside of each platen for following sorter pin tracks and a switch to determine the course of the platens through the slat sorter, the switch comprising:

an infeed sorter pin track, a straight-through sorter pin track, and a divert sorter pin track, an elongated switch arm having a pivot end and a tip which is opposite the pivot end, said pivot end being downstream from the tip end;

a prime mover for changing the position of the switch arm between a first position where the switch arm directs a diverter pin of a platen to the straight-through track and a second position wherein the switch arm directs a diverter pin of a platen to the divert track; and an arcuate cutout in the switch arm which allows the arm to be driven from one position to another position before a diverter pin adjacent the arm has traveled past the arm.

5. The slat sorter of claim 4 wherein the cutout is on the side of the switch arm which is adjacent to the straight-through track.

6. The slat sorter of claim 5 wherein (1) the switch arm has a pivot adjacent the pivot end about which the arm pivots when being moved from one position to another position and (2) the cutout is located upstream of the pivot.

7. The slat sorter of claim 3 wherein the boss functions as an axle for said bearing.

8. The slat sorter of claim 3 wherein the track is carried on a bracket of the frame.

9. The slat sorter of claim 3 wherein the track is an UHMW track.

10. The slat sorter of claim 3 wherein a slat supported by the bearing rolling on the track has a lower resistance to forward motion than the resistance to forward motion of a slat supported by an endless chain sliding on the track.

11. A slat sorter having a series of platens slidably mounted on an array of slats which are driven by a pair of endless chains, the sorter comprising:
   a frame,
   a track mounted on the frame so as to support the slats, and a ball bearing mounted on the end of a slat, whereby the bearing functions as a wheel and rolls on the track to support the slat, and wherein the end of the slat receives a bushing, a boss is formed on the bushing, and the bearing is mounted on the boss.

12. The slat sorter of claim 11 further comprising a pin for coupling the slat to the endless chain, wherein the pin passes through the chain, the boss, and the bushing.

13. The slat sorter of claim 12 wherein the pin can be removed to decouple the slat from the chain.

14. The slat sorter of claim 13 wherein the pin is removed at least from (1) the bushing and (2) the boss to decouple the slat from the chain.

15. The slat sorter of claim 14 wherein the pin has a free end received in the bushing and boss with a detent ball adjacent the free end to resist removal from the bushing and boss when the free end of the pin is received in the bushing and boss.

16. A switch for a slat sorter having a series of platens slidably mounted on an array of slats which are driven by an endless chain, a diverter pin on the underside of each of the platens for following pin tracks in the sorter, and switches to determine the course of the platens through the sorter, the switch comprising:
   an infeed track, a straight through track, and a divert track,
   an elongated switch arm having a pivot end and a tip which is opposite the pivot end, said pivot end being downstream from the tip end;
   motive means for changing the positions of the switch arm to direct a diverter pin to either the straight-through track or the divert track; and
   an arcuate cutout in the switch arm which allows the arm to be driven from one position to another before a diverter pin has traveled past the arm.

17. The switch of claim 16 wherein the cutout is on the side of the switch arm which is adjacent the straight-through track.

18. The switch of claim 16 wherein the cutout has a downstream exit portion which is in alignment with the straight-through track portion of the switch when the arm is in the divert position.

19. The switch of claim 16 further comprising:
   a first stop for abutting the tip of the switch arm in the divert position, the first stop defining the divert position so that the downstream portion of the switch arm side which guides the divert pin to the divert track is in alignment with the divert track.

20. The switch of claim 16 further comprising:
   an electric motor comprising the motive means: and
   a brake for the motive means, wherein the brake provides resistance to switch arm motion when the motive means is unpowered.

21. The switch of claim 20 wherein the electric motor comprises a limited angle torque motor.

22. The switch of claim 17 wherein (1) the switch arm has a pivot adjacent the pivot end about which the arm pivots when being moved from one position to another position and (2) the cutout is located upstream of the pivot.

23. The switch of claim 22 wherein the cutout is located between the tip of the switch arm and the pivot.

24. The switch of claim 23 wherein the cutout is located on the side of the switch arm that is adjacent the straight-through track.

25. The switch of claim 16
   wherein the (a) the motive means is a motor operably connected to the switch arm, (b) the switch arm is movable between (1) a first position where the switch arm directs a diverter pin of a platen to the straight-through track and (2) a second position wherein the switch arm directs a diverter pin of a platen to the divert track, and
   further comprising (a) a first stop against which the switch arm bears when located in its first position, (b) a second stop against which the switch arm bears when located in its second position, and (c) a brake in operable communication with the switch arm for urging the switch arm against one of the stops upon loss of power to the motor.

26. The switch of claim 25 wherein the motor is an electric limited angle torque motor.

27. The switch of claim 25 wherein the brake is carried by the motor.

28. The switch of claim 25 wherein the brake is constructed and arranged to provide resistance to switch arm motion without locking the switch arm in an immovable position so that a diverter pin of a platen striking the switch arm will rotate the arm toward one of the stops thereby preventing the diverter pin from colliding head-on with the arm.

29. The switch of claim 16 further comprising a slat sorter frame having a track supporting an endless chain, a bearing mounted on the end of a slat, wherein the bearing functions as a wheel and rolls on the track to support the slat.

30. The switch of claim 29 further comprising a bushing received in the end of a slat, a boss extending outwardly from the slat, and the bearing comprising a ball bearing that is carried by the boss.

31. A slat sorter comprising a series of platens slidably mounted on an array of slats which are driven by an endless chain comprising:
   (a) a frame,
   (b) a track mounted on the frame so as to support the slats, and a bearing mounted on the end of a slat, whereby the bearing functions as a wheel and rolls on the track to support the slat,
   (c) a diverter pin on the underside of each of the platens for following pin tracks in the sorter, and
   (d) a switch to determine the course of the platens through the sorter, the switch comprising an infeed track, a straight through track, a divert track, an elongated switch arm having a pivot end and a tip which is opposite the pivot end with the pivot end being downstream from the tip end, motive means for changing the position of the switch arm to direct a diverter pin to either the straight-through track or the divert track; and an arcuate cutout in the switch arm which allows the arm to be driven from one position to another before a diverter pin has traveled past the arm.

32. The slat sorter of claim 31 wherein the cutout is located upstream of the pivot end and on the side of the switch arm which is adjacent the straight-through track.

33. The slat sorter of claim 31 further comprising a bushing received in the end of a slat, a boss extending outwardly from the slat, and the bearing comprising a ball bearing that is carried by the boss supporting the slat on the track.

34. A slat sorter comprising:

(a) at least one platen carried by a slat;

(b) a diverter pin on the underside of the platen for following pin tracks of the sorter;

(c) the pin tracks of the sorter including an infeed track, a straight-through track, and a divert track;

(d) an elongate pivotable switch arm having an outlet end and a tip opposite the outlet end, the outlet end being downstream from the tip;

(e) a prime mover for urging the switch arm between (1) a straight-through position to direct a diverter pin of a platen along the straight-through track and (2) a divert position to direct a diverter pin of a platen along the divert track; and (f) a brake in operable communication with the switch arm and prime mover for urging the switch arm toward one of the divert and straight-through positions upon loss of power to the prime mover.

35. The slat sorter of claim 34 wherein the brake is constructed and arranged to provide resistance to switch arm motion without locking the switch arm in an immovable position so that a diverter pin of a platen striking the switch arm will rotate the arm toward either the divert position or the straight-through position thereby preventing the diverter pin from colliding head-on with the arm.

36. The slat sorter of claim 35 wherein the prime mover is an electric motor and the brake is mounted on the end of the motor.

37. The slat sorter of claim 36 wherein the electric motor is a limited angle torque motor.

38. The slat sorter of claim 34 wherein the switch arm has an acute cutout between its top and outlet end on the side of the switch arm that is adjacent the straight-through track for allowing the arm to be urged toward the divert position when in or adjacent the straight-through position and before a diverter pin of a platen has traveled past the arm.

39. The slat sorter of claim 34 wherein the platen is carried by at least two slats.

* * * * *